United States Patent [19]

Kleinschmidt et al.

[11] Patent Number: 5,761,236
[45] Date of Patent: Jun. 2, 1998

[54] LASER FOR GENERATING NARROW-BAND RADIATION

[75] Inventors: Jürgen Kleinschmidt, Weissenfels; Peter Heist, Jena, both of Germany

[73] Assignee: Lambda Physik Gesellschaft zur Herstellung Von Lasern mbH, Germany

[21] Appl. No.: 687,793

[22] Filed: Jul. 18, 1996

[30] Foreign Application Priority Data

Feb. 1, 1996 [DE] Germany .................. 196 03 637.2

[51] Int. Cl.$^6$ .................. H01S 3/08; H01S 3/137
[52] U.S. Cl. .................. 372/100; 372/20; 372/32
[58] Field of Search .................. 372/19, 20, 23, 372/24, 29, 32, 92, 98, 100

[56] References Cited

U.S. PATENT DOCUMENTS

| | | | |
|---|---|---|---|
| 3,611,436 | 10/1971 | Rigrod | 372/20 |
| 3,775,699 | 11/1973 | Cassels | 372/19 |
| 5,150,370 | 9/1992 | Furuya et al. | 372/106 |

FOREIGN PATENT DOCUMENTS

| | | |
|---|---|---|
| 60-205420 | 10/1985 | Japan. |
| 61-139950 | 6/1986 | Japan. |

OTHER PUBLICATIONS

Abstract and handouts of an Aug. 15–18, 1995 conference, in Colorado Springs, Colorado, from First International Symposium on 193nm Lithography, "ArF Excimer Laser with High Repetition Rate for DUV Lithography," by R. Pätzel, I. Bragin, U. Rebhan & d. Basting, 21 pages in length.

Y. G. Basov, "Telescopic and dispersive prism devices for laser technology," *J. Opt. Technol.*, vol. 62 (3), Mar. 1995, pp. 141–152.

*Primary Examiner*—John D. Lee
*Attorney, Agent, or Firm*—Limbach & Limbach L.L.P.

[57] ABSTRACT

A laser, especially an excimer laser, is designed to generate narrow-band radiation and comprises a laser resonator, including two reflecting elements (12, 14) between which there is disposed a laser active medium (10), and further comprises a group of several refractive dispersive elements (32, 34) arranged in the laser beam path and each deflecting, incident light at an angle ($\gamma_a$, $\gamma_b$) which is specific of the wavelength of the incident light. It is provided to reduce variations of the emission wavelength which are temperature responsive and time dependent during burst operation by giving at least one of the refractive dispersive elements (32) a refractive index which increases as the temperature goes up and at least one of these elements (34) a refractive index which drops as the temperature rises.

18 Claims, 4 Drawing Sheets

LASER FOR GENERATING NARROW-BAND RADIATION

FIELD OF THE INVENTION

The instant invention relates to a laser for generating narrow-band radiation, comprising
- a laser resonator which includes two reflecting elements and a laser active medium disposed between them,
- a group of several refractive, wavelength selective elements each deflecting incident light at an angle which is specific of the wavelength of the incident light.

BACKGROUND OF THE INVENTION

A laser of this kind is known from U.S. Pat. No. 5,150,370.

Lasers of the kind mentioned are applied particularly in the art of photographic lithography for the production of integrated circuits. Wavelengths below 200 nm are required for making structures in the dimensional range of 0.18 μm by photographic lithography. Achromatic imaging optics for this wavelength range are difficult to produce. For this reason radiation of very narrow bandwidth is needed for the photolithographic production of structures of the above mentioned order of magnitude in order to keep errors caused by chromatic aberration in the structures obtained through photographic lithography within admissible tolerance limits. Acceptable bandwidths for refractive imaging optics lie in the range of 1 pm (refractive optics made of quartz alone: 0.3 pm, refractive optics of different materials: a few pm), the range extending from 10 pm to 100 pm for the catadioptrics which operate with a beam splitter and mirrors. In contrast thereto, an ArF excimer laser ($\lambda$=193 nm) has a bandwidth of 430 pm in the so-called free running operation so that optical elements must be provided inside the laser to limit the bandwidth if the above requirements are to be met.

It is known in the art to locate gratings providing beam expansion, prism assemblies, and/or Fabry-Perot etalons in the beam path of the resonator for narrowing the bandwidth.

As gratings and Fabry-Perot etalons are characterized by a high loss factor per round trip (transmission <70%) they are suited only conditionally for use in an ArF laser of which the resonator loss is much greater than in an XeCl or KrF laser, for instance. With Brewster prisms, on the other hand, and especially prisms with an antireflective coating the transmission is more than 95%.

Arrangements thus have been suggested with one or two dispersion prisms disposed in the resonator of the laser (1st International Symposium on 193 nm Lithography, Colorado Springs, Aug. 15–18, 1995). In this manner, bandwidths of approximately 10 pm can be achieved. The principle of such an arrangement is illustrated diagrammatically in FIG. 1 which depicts part of the beam path of the resonator. The incoming beam passes through an (optional) achromatic beam expander 1 and then is directed through a dispersion prism 2 to the highly reflective mirror 3 of the resonator which in turn reflects the incident light through the prism 2 and the beam expander 1 back to the second mirror of the resonator. The resonator mirror 3 is disposed at an angle with respect to the optical axis A of the laser, this angle corresponding to the deflection angle $\gamma$ of the prism for the desired wavelength, e.g. $\lambda$=193 nm so that essentially only light of this wavelength is reflected and circulated in the resonator.

However, in excimer lasers including such prism assemblies time variations of the emission wavelength of the laser occur during burst operation, whereby the usefulness of the laser is limited as far as photographic lithography is concerned.

SUMMARY OF THE INVENTION

It is the object of the invention to improve a laser of the kind specified initially such that variations in radiation in response to temperature and, therefore, dependent on time during burst operation, are reduced as best as possible.

According to the solution proposed by the invention, in a laser for generating narrow-band radiation, comprising a laser resonator which includes two reflecting elements and a laser active medium disposed between them, as well as a group of several refractive, wavelength selective elements each deflecting incident light at an angle ($\gamma_a$, $\gamma_b$) which is specific of the wavelength of the incident light, at least one of the refractive, wavelength selective elements has a refractive index which rises as the temperature rises (dn/dT>0) and at least one of these elements has a refractive index which drops as the temperature rises (dn/dT<0). The laser may be an excimer laser, especially an ArF excimer laser. The group of refractive, wavelength selective elements preferably are arranged in the beam path of the resonator.

It was found that the variations in time of the emission wavelength, as observed with arrangements according to the state of the art, are due to the fact that the refractive index of the prisms used is dependent upon temperature and, therefore, the deflection angle for the desired radiation, e.g. light of 193 nm wavelength, varies during burst operation because of the radiation absorption in correspondence with the heating and cooling of the prisms. In accordance with the invention, this variation of the deflection angle at least is reduced by use of a combination of no less than two refractive elements which differ in sign of dn/dT.

If the elements are designed and arranged appropriately the temperature responsive changing of the deflection angle can be eliminated altogether. In particular, the angles of incidence at the refractive dispersive elements can be selected such that the sum of the individual deflection angles of the respective elements at a predetermined wavelength of the incident light is independent of temperature variations during operation of the laser.

For the ultraviolet range of the spectrum, quartz glass is the preferred material for at least one refractive dispersive element, especially quartz glass known under the tradename of Suprasil (dn/dT>0), while CaF$_2$ (dn/dT<0) is the material for at least one refractive dispersive element.

A special embodiment of the invention comprises a beam splitter which is disposed between the laser active medium and one of the reflecting elements, the group of refractive, wavelength selective elements being arranged between the beam splitter and the reflecting element. In this way the assembly which confines the bandwidth is positioned in a part of the resonator which, in operation, has a relatively low light intensity as a consequence of which the service life of the assembly is prolonged.

The refractive, dispersive elements particularly may be dispersion prisms. At the same time, preferably at least one of these prisms is a Brewster prism. The surface of incidence of the other prisms may be given an antireflective coating.

The laser according to the invention especially may comprise a first dispersion prism and a second dispersion prism, the change in response to temperature of the refractive index of the first prism having a different sign than the change of the refractive index of the second prism, and the apex angle of the second prism being selected such that upon incidence of light radiating through the first prism on the second prism at the Brewster angle, the overall deflection angle as determined by the first and second prisms is independent of temperature variations during operation of the laser. This eliminates the need for an antireflective coating on the surface of incidence of the second prism.

Advantageously, the surfaces of incidence of the prisms are illuminated as completely as possible. To accomplish that, a beam expander may be arranged ahead of the first prism.

In another embodiment of the invention a Fabry-Perot etalon may be included in the beam path of the laser in front of or behind the group of refractive dispersive elements. Bandwidths of less than 1 pm are obtainable with this embodiment.

BRIEF DRESCRIPTION OF THE DRAWING

The invention will be described further, by way of example, with reference to the accompanying drawings, in which:

FIG. 1 illustrates the principle of a prism assembly confining the bandwidth;

FIG. 2 diagrammatically shows a first embodiment of a laser arrangement according to the invention;

FIG. 3 shows the beam path through the two prisms confining the bandwidth in the laser arrangement shown in FIG. 2;

FIG. 4 presents the zero position function in dependence on the apex angle and the angle of incidence of the second prism for a first wavelength;

FIG. 5 presents the zero position function in dependence on the apex angle and the angle of incidence of the second prism for a second wavelength;

FIG. 6 depicts the assembly which confines the bandwidth in a second embodiment of the invention.

DESCRIPTION OF THE PREFERRED EMBODIMENTS

Figure 2:
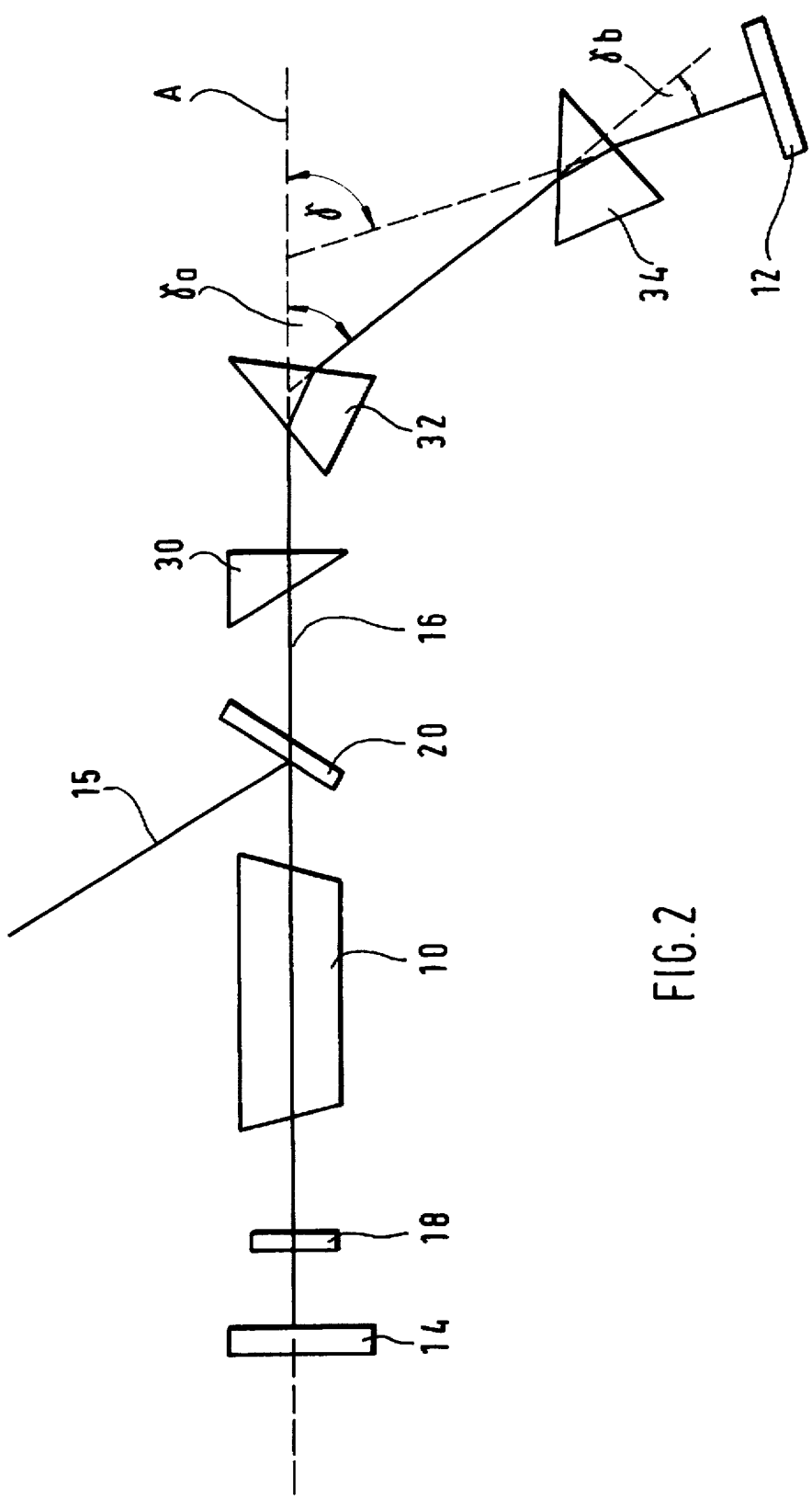

FIG. 2 is diagrammatic presentation of the beam path of a first embodiment of the invention, an excimer laser being used as the example.

The laser resonator comprises two highly reflective mirrors 12, 14 with a laser active medium between them which is brought about by gas discharge caused by electrodes in an appropriate compartment 10. A polarizing beam splitter permitting approximately 98% p-polarized light to pass while reflecting approximately 98% of s-p-polarized light is disposed between the laser active medium 10 and the mirror 12. At the other side, i.e. between the laser active medium 10 and the mirror 14, there is a rotatory component 18 which rotates the polarization plane of the light, e.g. a λ/4 plate or a Faraday rotator. The polarizing beam splitter couples out essentially s-polarized light 15 from the resonator, while it passes essentially p-polarized light 16 which then is reflected by mirror 12 so as to run through another cycle in the resonator. Component 18 has the effect of coupling out a certain portion of the resonator radiation. The laser arrangement including the beam splitter 20 is advantageous in that only part of the radiation generated in the laser active medium is incident on optical elements which are arranged between the beam splitter 20 and the mirror 12, whereby their service life is prolonged.

Figure 3:
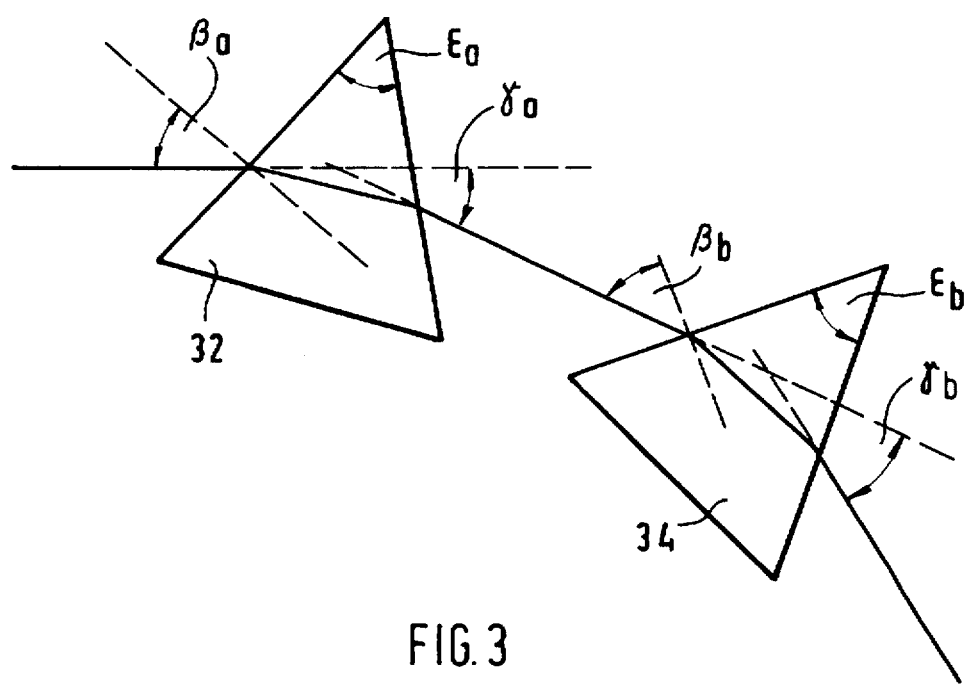

An assembly which narrows the bandwidth is arranged between the beam splitter 20 and the mirror 12. It consists of an achromatic beam expander 30, a Brewster prism 32 made of a quartz glass which is highly transparent to ultraviolett light, preferably Suprasil, and a prism 34 made of $CaF_2$ which is coated to render it antireflecting on its surface of incidence. The beam path through the prisms 32 and 34 is shown schematically in FIG. 3. The temperature coefficient of the refractive index, i.e. the derivation of the refractive index according to temperature is $18 \cdot 10^{-6}$ $K^{-1}$ for Suprasil and $-3 \cdot 10^{-6}$ $K^{-1}$ for $CaF_2$ at $\lambda = 193$ nm. The deflection angle $\Gamma_a$ of prism 32 thus changes in opposite sense to the deflection angle $\gamma_b$ of prism 34 when the temperature changes. Therefore, the variation of the total angle $\gamma = \gamma_a + \gamma_b$ upon temperature variation is kept small or even caused to disappear entirely.

The condition for disappearance of the variation of the total deflection angle γ following a temperature change $\Delta T_a$ at prism 32 and a temperature change $\Delta T_b$ at prism 34 may be expressed as follows:

$$\Delta \gamma = \frac{d\gamma_a}{dn_a} \cdot \frac{dn_a}{dT} \cdot \Delta T_a + \frac{d\gamma_b}{dn_b} \cdot \frac{dn_b}{dT} \cdot \Delta T_b = 0 \quad (1)$$

wherein index "a" designates values belonging to prism 32 and index "b" designates values belonging to prism 34. $n_a$, $n_b$ being the refractive indices of prisms 32 and 34, respectively.

The table below lists the values used in the calculations made here:

|  | Suprasil | | $CaF_2$ | |
| --- | --- | --- | --- | --- |
|  | 248 nm | 193 nm | 248 nm | 193 nm |
| refractive index n | 1.508 | 1.561 | 1.467 | 1.501 |
| dispersion dn/dλ(μm$^{-1}$) | −0.6 | −1.6 | −0.4 | −1.0 |
| temperature coefficient dn/dT($10^{-6}$ K$^{-1}$) | 14.9 | 18 | −7.3 | −3.0 |
| absorption coefficient α($10^{-3}$ cm$^{-1}$) | 5.3 | 20 ... 30 | 3.3 | 5.6 |
| density (g/cm$^3$)g | 2.2 | | 3.18 | |
| specific heat c(J/g · K) | 0.772 | | 0.85 | |
| heat conductivity (W/m · K) | 1.38 | | 9.71 | |

Data taken from: Journal of Non-Crystalline Solids 135 (1991) 86; Kohlrausch (1968); Heraeus, Quarzglas für Optik - Daten und Eigenschaften, 1994.

The derivations $d\gamma_a/dn_a$ and $d\gamma_b/dn_b$, in general, depend on the refractive index, the geometry of the refractive element, and the direction of the incident ray. For prisms in particular, they are determined by the respective refractice indices $n_a$, $n_b$, the apex angles $\epsilon_a$, $\epsilon_b$ of the prisms, and the angles of incidence $\beta_a$ and $\beta_b$, respectively, the relationship between the deflection angle γ, the angle of incidence β, the apex angle ε, and the refractive index n being well known.

Where effects of heat conduction are negligible, the following applies to the temperature change due to radiation absorption ΔT:

$$\Delta T = (F\alpha)/(gc)$$

wherein

α=absorption coefficient of the material of the prism g=density of the material of the prism c=specific heat of the material of the prism F=total fluence of the laser radiation at the entry into the prism.

Due to the negligible absorption within prism 32, the total fluence $F_b$ at the entry into prism 34 is nearly the same as $F_a$ (the total fluence into prism 32). Thus $\Delta T_a/\Delta T_b$ is not time-dependent. The solution of equation (1), consequently, always is possible by proper choice of $d\gamma_a/dn_a$ and $d\gamma_b/dn_b$, respectively. If one applies any common numerical zero position search method equation (1) can be resolved readily according to any one of the determining values $\beta_a$, $\epsilon_a$, $\beta_b$, and $\epsilon_b$, for example according to angle of incidence $\beta_b$, with apex angle $\epsilon_b$ of prism 34, apex angle $\epsilon_a$, and the angle of incidence $\beta_a$ of prism 32 being given. Also, the respective value, e.g. an angle of incidence $\beta_b$ which renders the whole deflection independent of temperature when the other values are given can be determined easily by experiment.

Solutions of equation (1) for two different wavelengths are given below for purposes of illustration. To this end, it is convenient to define a zero position function G as follows:

$$G = F^2(n_a\epsilon_a, \beta_a; n_b, \epsilon_b, \beta_b) - \frac{(\lfloor dn_b/dT \rfloor \cdot \Delta T_b)^2}{(\lfloor dn_a/dT \rfloor \cdot \Delta T_a)^2}$$

with $$F(n_a\epsilon_a, \beta_a; n_b, \epsilon_b, \beta_b) = \frac{d\gamma_a/dn_a}{d\gamma_b/dn_b}$$

The zero positions of G correspond to the solutions of equation (1).

Figure 4:
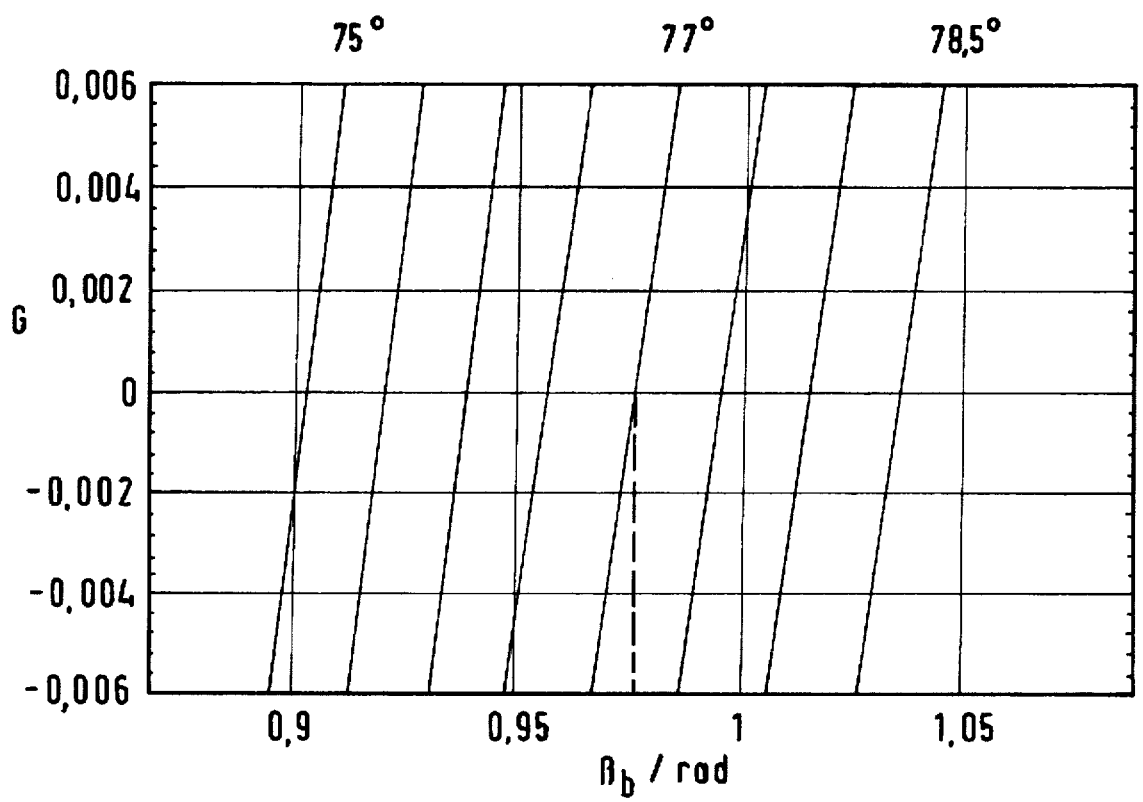

In the first example, prism 32 is a Brewster prism made of Suprasil with symmetric beam passage and an apex angle $\epsilon_a=67.08°$. The apex angle of $CaF_2$ prism 34 was given as 75°, 75.5°, 76°, ... 78.5°, and equation (1) was resolved for $\lambda=248$ nm by determining the zero position of function G with $\beta_b$ being the variable. In FIG. 4, function G is plotted above the angle of incidence $\beta_b$ for the various apex angles. It will seen that for each apex angle $\epsilon_b$, an angle of incidence $\beta_b$ may be found at which the thermally provoked changes of the deflection angles $\gamma_a$, $\gamma_b$ are compensated, in other words G=0. Compensation occurs, for example, for $\epsilon_b=77°$ and $\beta_b=55.86°$ (0.975 rad). Compensation especially may be achieved at the Brewster's angle ($\beta_b=0.972$ rad) if the apex angle $\epsilon_b=76.9°$. In this case it is not necessary to provide the entry surface of prism 34 with an antireflective coating.

Figure 5:
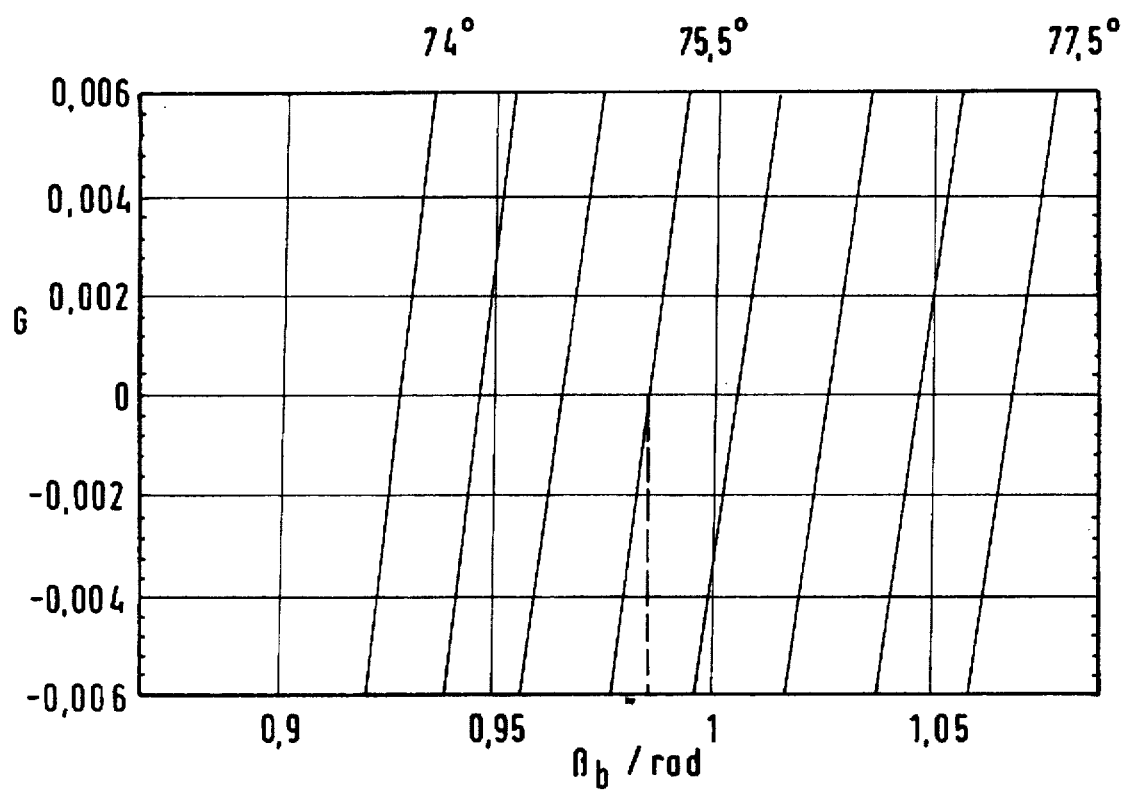

In the second embodiment, prism 32 is a Brewster prism made of Suprasil with symmetric beam passage and an apex angle $\epsilon_a=65.3°$. The apex angle of the $CaF_2$ prism was given as 74°, 74.5°, 75°, ... 77.5°, and equation (1) was solved for $\lambda=193$ nm with $\beta_b$ as the variable. In FIG. 5, function G is plotted above the angle of incidence $\beta_b$ for the various apex angles. Here, compensation at the Brewster's angle ($\beta_b=0.973$ rad) occurs at an apex angle $\epsilon_b=77.5°$.

The principle described above may be applied readily also to assemblies which limit the bandwith and contain more than two prisms. The corresponding generalization of equation (1) is as follows:

$$\Delta\gamma = \frac{d\gamma_a}{dn_a}\frac{dn_a}{dT}\Delta T_a + \frac{d\gamma_b}{dn_b}\frac{dn_b}{dT}\Delta T_b + \frac{d\gamma_c}{dn_c}\frac{dn_c}{dT}\Delta T_c + \frac{d\gamma_d}{dn_d}\frac{dn_d}{dT}\Delta T_d + \ldots = 0 \quad (2)$$

wherein indices c, d designate the respective values of the further prisms. Here, too, there always is a solution, provided at least one prism is made of a material having another sign of the temperature coefficient of the refractive index than that of the material of other prisms.

Figure 1:
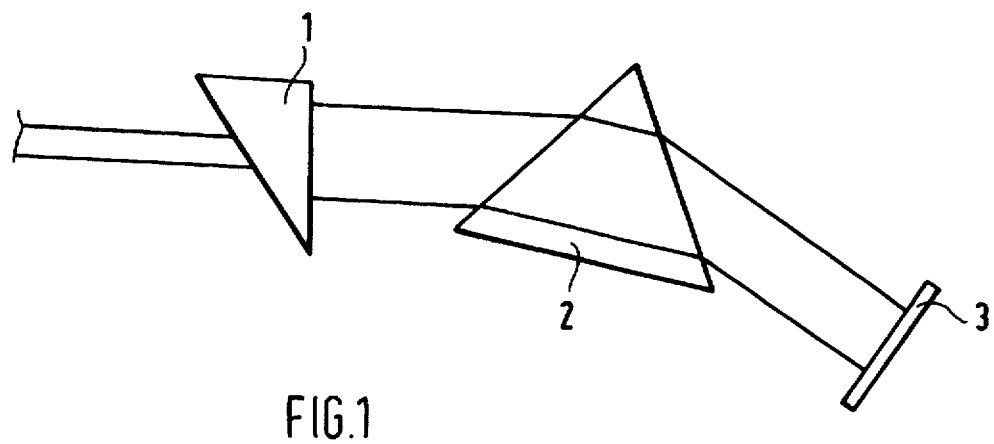
Figure 6:
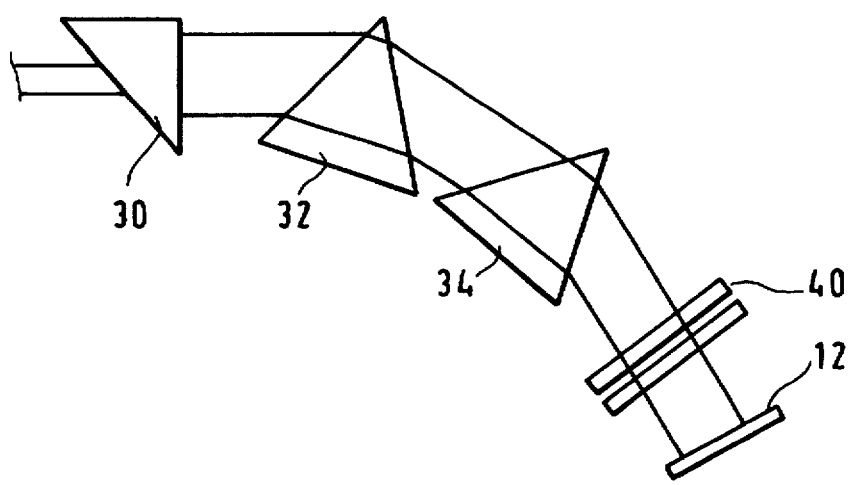

FIG. 6 illustrates an assembly narrowing the bandwidth in accordance with a second embodiment of the invention. This embodiment differs from the one shown in FIG. 1 in that the assembly narrowing the bandwidth includes a Fabry-Perot etalon 40 between prism 34 and mirror 12 in addition to the two prisms 32 and 34. Bandwidths of 1 pm and less are obtainable with this arrangement. Moreover, the apparatus according to the invention may comprise other elements to limit the bandwidth, such as a grating instead of mirror 14.

In the embodiments described above the narrowing prism assembly was located in the area between the beam splitter 20 and the mirror 12. This is advantageous in view of the fact that less radiation loading and less heating is suffered. In principle, a prism assembly with thermal compensation, as described above, may be positioned anywhere in the beam path of the laser. Thus the invention may realized also with other laser configurations than the one illustrated in FIG. 1, for instance, with those functioning without the polarizing beam splitter 20.

What is claimed is:

1. A laser for generating narrow-band radiation, comprising:
   a laser resonator which includes two reflecting elements between which there is disposed a laser active medium, and
   a plurality of refractive, wavelength selective elements each deflecting incident light at an angle that depends upon the wavelength of the incident light, wherein at least one of the refractive, wavelength selective elements has a refractive index which increases as the temperature rises and at least another one of the refractive, wavelength selective elements has a refractive index which decreases as the temperature rises.

2. The laser as claimed in claim 1, wherein at least one of the refractive, wavelength selective elements is made of quartz glass and at least another one of the refractive wavelength selective elements is made of $CaF_2$.

3. The laser as claimed in claim 1, further comprising:
   a beam splitter arranged between the laser active medium and one of the reflecting elements, wherein the plurality of refractive, wavelength selective elements being located between the beam splitter and the one reflecting element.

4. The laser as claimed in claim 1, wherein the plurality of refractive, wavelength selective elements are dispersion prisms.

5. The laser as claimed in claim 4, wherein the plurality of refractive, wavelength selective elements includes at least one Brewster prism.

6. The laser as claimed in claim 4, wherein the surfaces of incidence of the prisms are lighted substantially completely.

7. The laser as claimed in claim 4, further comprising:
   a beam expander disposed in the laser resonator adjacent to one of the prisms.

8. The laser as claimed in claim 4, wherein the prisms are disposed in the resonator such that radiation is incident onto one of the prisms at Brewster's angle.

9. The laser as claimed in claim 1, further comprising:
   a Fabry-Perot etalon contained in the beam path of the laser ahead of or behind the plurality of refractive, wavelength selective elements.

10. A laser for generating narrow-band radiation, comprising:
    a laser resonator which includes two reflecting elements between which there is disposed a laser active medium, and
    a plurality of refractive, wavelength selective elements each deflecting incident light at an angle which is specific of the wavelength of the incident light, at least one of the refractive, wavelength selective elements has a refractive index which increases as the temperature rises and at least another one of the refractive, wavelength selective elements has a refractive index which decreases as the temperature rises,
    wherein the angles of incidence at the refractive, wavelength selective elements are selected such that the sum of the individual deflection angles of the respective elements at a predetermined wavelength of the incident light is independent of radiation induced temperature variations during operation of the laser.

11. A laser for generating narrow-band radiation, comprising:

a laser resonator which includes two reflecting elements between which there is disposed a laser active medium, and a plurality of refractive, wavelength selective elements each deflecting incident light at an angle which is specific of the wavelength of the incident light, at least one of the refractive, wavelength selective elements has a refractive index which increases as the temperature rises and at least another one of the refractive, wavelength selective elements has a refractive index which decreases as the temperature rises, wherein the plurality of refractive, wavelength selective elements contains first and second dispersion prisms, the variation in response to temperature of the refractive index of the first prism having a different sign than the variation in response to temperature of the refractive index of the second prism, and that the apex angle of the second prism is selected such that upon incidence at Brewster's angle on the second prism of the light having passed through the first prism the overall deflection angle determined by the first and second prisms is independent of radiation-induced temperature variations during operation of the laser.

12. A laser for generating narrow-band radiation, comprising:

a resonant laser cavity defined by at least two mirrors and having a laser active medium disposed therebetween for generating a laser beam; and a first and a second refractive elements disposed in the laser cavity to select the wavelength of the laser beam, the first and second refractive elements each deflect incident light at an angle that depends upon the refractive index of that refractive element and the wavelength of the incident light, the first refractive element has a refractive index that increases as the temperature thereof increases, and the second refractive element has a refractive index that decreases as the temperature thereof increases;

wherein the first and second refractive elements are selected to deflect a predetermined wavelength of the laser beam at a total deflection angle such that variations in the total deflection angle for the predetermined wavelength, due to temperature variations of the first and second refractive elements, are minimized.

13. The laser as claimed in claim 12, wherein the first and second refractive elements are dispersion prisms.

14. The laser as claimed in claim 13, wherein the first refractive element is made of quartz glass and the second refractive element is made of $CaF_2$.

15. The laser as claimed in claim 13, wherein the prisms are disposed in the laser cavity such that the laser beam is incident onto one of the prisms at Brewster's angle.

16. The laser as claimed in claim 13, wherein at least one of the first and second refractive elements is a Brewster prism.

17. The laser as claimed in claim 13, further comprising:

a beam expander disposed in the laser cavity such that the surfaces of the prisms are lighted substantially completely.

18. The laser as claimed in claim 13, further comprising:

a Fabry-Perot etalon disposed in the laser cavity adjacent to one of the first and second refractive elements.

* * * * *